US008471883B2

(12) United States Patent
Serizawa et al.

(10) Patent No.: US 8,471,883 B2
(45) Date of Patent: Jun. 25, 2013

(54) OPTICAL SCANNER AND IMAGE FORMING APPARATUS INCLUDING SAME

(75) Inventors: Keiichi Serizawa, Yokohama (JP);
Takeshi Yamakawa, Fujisawa (JP);
Kazunori Watanabe, Tama (JP)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 12/544,593

(22) Filed: Aug. 20, 2009

(65) Prior Publication Data
US 2010/0033787 A1 Feb. 11, 2010

(30) Foreign Application Priority Data

| Aug. 20, 2008 | (JP) | 2008-212178 |
| Aug. 25, 2008 | (JP) | 2008-215108 |
| Aug. 18, 2009 | (JP) | 2009-189245 |
| Aug. 18, 2009 | (JP) | 2009-189265 |

(51) Int. Cl.
*B41J 2/435* (2006.01)
*B41J 27/00* (2006.01)

(52) U.S. Cl.
USPC .......................................... 347/245

(58) Field of Classification Search
USPC ............................ 347/245, 257, 263
See application file for complete search history.

(56) References Cited

U.S. PATENT DOCUMENTS

| 5,467,118 A * | 11/1995 | Gragg et al. ............ 347/87 |
| 6,195,190 B1 * | 2/2001 | Tachibe et al. ........ 359/216.1 |
| 6,813,052 B2 * | 11/2004 | Yoshizawa ............ 359/216.1 |
| 7,016,092 B2 * | 3/2006 | Takayama ............ 359/204.1 |
| 7,256,813 B2 | 8/2007 | Serizawa et al. |
| 7,319,475 B2 * | 1/2008 | Tomita et al. .......... 347/243 |
| 7,355,617 B2 | 4/2008 | Serizawa et al. |
| 7,440,001 B2 * | 10/2008 | Ono et al. ............ 347/257 |

(Continued)

FOREIGN PATENT DOCUMENTS

| JP | 3-54913 | 5/1991 |
| JP | 10-268218 | 10/1998 |

(Continued)

OTHER PUBLICATIONS

Nordex Product Data Sheet, attached under file D027_Self_Sealing_Screw, created Jan. 7, 2004, Modified Mar. 23, 2005 (as shown in file D027_Self_Sealing_Screw_created. Single page.*

(Continued)

*Primary Examiner* — Laura Martin
*Assistant Examiner* — Jeremy Bishop
(74) *Attorney, Agent, or Firm* — Cooper & Dunham LLP

(57) ABSTRACT

An optical scanner includes a light source, an optical element, a deflector, a casing, and a first cover. The deflector deflects the light beam emitted from the light source to scan a photoreceptor through the optical element. The casing includes an upper opening, walls including a transparent plate defining a deflector compartment to accommodate the deflector, and an optical element mounting portion to accommodate the light source and the optical element. The first cover covers the upper opening of the casing and includes a recessed portion recessed toward the bottom of the casing and including a first opening at the bottom thereof facing the deflector. The recessed portion and the walls are directly or indirectly connected to define a single continuous space isolating the deflector compartment from the optical element mounting portion. The recessed portion and the deflector compartment communicate via the first opening.

20 Claims, 18 Drawing Sheets

U.S. PATENT DOCUMENTS

| | | | |
|---|---|---|---|
| 7,443,556 B2 | 10/2008 | Serizawa | |
| 7,538,924 B2 * | 5/2009 | Tomita | 359/204.1 |
| 7,619,643 B2 * | 11/2009 | Sakaue et al. | 347/138 |
| 7,782,352 B2 * | 8/2010 | Ohsugi | 347/242 |
| 7,800,804 B2 * | 9/2010 | Ohsugi | 359/196.1 |
| 8,027,075 B2 * | 9/2011 | Serizawa | 359/206.1 |
| 8,035,677 B2 * | 10/2011 | Uduki | 347/242 |
| 8,169,458 B2 * | 5/2012 | Itami et al. | 347/243 |
| 2007/0098460 A1 | 5/2007 | Serizawa | |
| 2008/0218828 A1 | 9/2008 | Serizawa | |

FOREIGN PATENT DOCUMENTS

| | | |
|---|---|---|
| JP | 2004177512 A * | 6/2004 |
| JP | 2004-354848 | 12/2004 |
| JP | 2005-234506 | 9/2005 |
| JP | 2006-72038 | 3/2006 |
| JP | 2006-78903 | 3/2006 |
| JP | 2007-240944 | 9/2007 |
| JP | 2008-170861 | 7/2008 |

OTHER PUBLICATIONS

Japanese official action dated Feb. 19, 2013 in connection with corresponding Japanese patent application No. 2009-189245.

Japanese official action dated Feb. 19, 2013 in connection with corresponding Japanese patent application No. 2009-189265.

* cited by examiner

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2008-212178, filed on Aug. 20, 2008, 2008-215108, filed on Aug. 25, 2008, 2009-189245, filed on Aug. 18, 2009, and 2009-189265, filed on Aug 18, 2009, in the Japan Patent Office, which are hereby incorporated herein by reference in their entirety.

BACKGROUND OF THE INVENTION

1. Field of the Invention

Exemplary aspects of the present invention generally relate to an optical scanner and an image forming apparatus including the optical scanner.

2. Description of the Background Art

Optical scanners employed in image forming apparatuses comprise multiple light sources and a deflector such as a polygon scanner. In order to achieve both high productivity and high imaging quality, typically both the number of light sources and the number of rotations of the deflector are increased.

Increasing the number of light sources increases the cost of the optical scanner as a whole, however, and also requires the deflector to be operated at high speed. A further drawback to this approach is that the amount of heat generated from operation of the deflector increases as the number of rotations of the polygon scanner increases. If the polygon scanner is not isolated from the rest of the optical scanner by a partition member such as a wall, hot air generated and spread by deflection mirrors undesirably and unevenly heats optical elements in the optical scanner, causing optical properties of the optical scanner to deteriorate and thus degrading imaging quality.

Referring now to FIG. 10, there is provided a cross-sectional view of a related-art optical scanner. The related-art optical scanner includes an optical casing 801, a polygon scanner 802, soundproof glasses 803a and 803b, fθ lenses 804a, 804b, 804c, and 804d, a long lens 805a, 805b, 805c, and 805d, first mirrors 806a, 806b, 806c, and 806d, second mirrors 807a, 807b, 807c, and 807d, third mirrors 808a, 808b, 808c, and 808d, dustproof glasses 809a, 809b, 809c, and 809d, an upper cover 810, a bottom cover 801, a lower cover 811, photoreceptor drums 812a, 812b, 812c, and 812d, and optical paths 813a, 813b, 813c, and 813d.

As illustrated in FIG. 10, even if airspace in which deflection mirrors rotate is in the optical scanner which is isolated from outside to some extent, as the deflector rotates at high speed, tiny particles of foreign substance such as dust unevenly adhere to the deflection mirrors after extended use, adversely affecting reflection characteristics of the deflector. As a result, unity of scan light of the optical scanner is degraded and therefore imaging quality is also degraded.

To address the above-described problems, one related-art optical scanner of an image forming apparatus includes a cover provided substantially above the deflector to seal the deflector within an optical casing of the optical scanner. With this configuration, it is possible to reduce, if not prevent entirely, hot air from scattering and contamination of the deflection mirrors.

One example of such an optical scanner is illustrated in FIG. 11. FIG. 11 is a cross-sectional view of the related-art optical scanner.

The optical scanner in FIG. 11 includes an optical casing 901, a polygon scanner 902, soundproof glasses 903a and 903b, fθ lenses 904a, 904b, 904c, and 904d, first mirrors 906a, 906b, 906c, and 906d, second mirrors 907a, 907b, 907c, and 907d, dustproof glasses 909a, 909b, 909c, and 909d, an upper cover 910, a lower cover 911, photoreceptor drums 912a, 912b, 912c, and 912d, and optical paths 913a, 913b, 913c, and 913d.

As describe above, in order to achieve high productivity and high imaging quality, the deflector is rotated at high speed. When the deflector is sealed in the optical casing as illustrated in FIG. 11 and rotated at high speed, heat does not get dissipated, thereby increasing the temperature of the deflector. As a result, the temperature of the deflector exceeds its maximum operating temperature and/or the heat migrates to other optical elements through the optical casing, thereby degrading the optical characteristics.

In view of the above, various approaches have been proposed in an attempt to solve the problem. For example, one related-art optical scanner includes partitions provided to a place where a rotary deflector is mounted in a casing of an optical scanner so as to reduce adverse effect of heat generated by the rotary deflector in the optical scanner and to protect the deflector from dust.

In another related-art optical scanner, a shielding member is provided between the deflector and the optical elements so as to block airflow and thus reduce adverse effect of heat generated in the optical scanner.

Still another related-art optical scanner includes a cover for sealing a mounting portion of the deflector from the outside air. The cover includes ribs that project toward the deflector to prevent heat from scattering, thereby cooling inside the optical scanner effectively.

Although advantageous, such optical scanners still suffer from a drawback in that, when the deflector is rotated at high speed while sealed within the optical casing of the optical scanner, the temperature of the deflector increases excessively and heat migrates to the optical elements, causing degradation of optical characteristics of the optical scanner.

SUMMARY OF THE INVENTION

In view of the foregoing, in one illustrative embodiment of the present invention, an optical scanner includes a light source, an optical element, a deflector, a casing, and a first cover. The light source emits a light beam. The optical element including a scan lens converts the light beam into a desirable shape. The deflector deflects the light beam to scan a photoreceptor with the light beam. The casing houses the light source, the optical element, and the deflector. The casing includes an upper opening, walls including a transparent plate defining a deflector compartment to accommodate the deflector, and an optical element mounting portion to accommodate the light source and the optical element. The first cover covers the upper opening of the casing and includes a recessed portion recessed toward the bottom of the casing. The recessed portion includes a first opening at the bottom thereof facing the deflector. The recessed portion of the first cover and the walls of the deflector compartment are directly or indirectly connected to form a single continuous space isolating the deflector compartment from the optical element mounting portion, and the recessed portion and the deflector compartment communicate via the first opening.

In another illustrative embodiment of the present invention, an image forming apparatus includes a photoreceptor and an optical scanner. The optical scanner includes a light source, an optical element, a deflector, a casing, and a first cover. The light source emits a light beam. The optical element including a scan lens converts the light beam into a desirable shape. The deflector deflects the light beam to scan a photoreceptor with the light beam. The casing houses the light source, the optical element, and the deflector. The casing includes an upper opening, walls including a transparent plate defining a deflector compartment to accommodate the deflector, and an optical element mounting portion to accommodate the light source and the optical element. The first cover covers the upper opening of the casing and includes a recessed portion recessed toward the bottom of the casing. The recessed portion includes a first opening at the bottom thereof facing the deflector. The recessed portion of the first cover and the walls of the deflector compartment are directly or indirectly connected to form a single continuous space isolating the deflector compartment from the optical element mounting portion, and the recessed portion and the deflector compartment communicate via the first opening.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
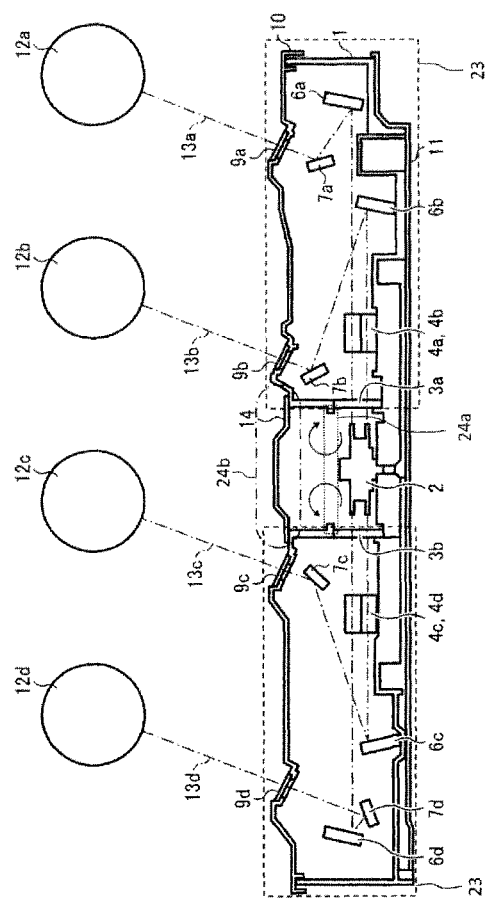
FIG. 1 is a cross-sectional view of an optical scanner, according to an illustrative embodiment of the present invention.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an optical scanner using a symmetrical scan method employed in a tandem-type full color image forming apparatus (hereinafter simply referred to as an image forming apparatus) according to an illustrative embodiment of the present invention is described.

In a symmetrical scan method, optical elements except a deflector 2 are symmetrically disposed at the left (a left station) and the right (a right station) about the deflector 2 that is disposed substantially at the center of the optical scanner. The optical scanner is provided substantially at the center of the image forming apparatus.

In FIG. 1, the optical scanner in FIG. 1 includes an optical casing 1, the deflector 2 (polygon scanner), soundproof glasses 3a and 3b, optical elements such as fθ lenses (scan lenses) 4a, 4b, 4c, and 4d, first mirrors 6a, 6b, 6c, and 6d, second mirrors 7a, 7b, 7c, and 7d, and light sources 21a and 21b (shown in FIG. 12), dustproof glasses 9a, 9b, 9c, and 9d, a cover 10 serving as a first cover, a bottom cover 11, photoreceptors 12a, 12b, 12c, and 12d, optical paths 13a, 13b, 13c, and 13d, and a second cover 14.

In FIG. 1, The right station includes devices with letter symbols "a" and "b". The left station includes devices with letter symbols "c" and "d". The left and the right stations have the same configuration as all the other except for the color of image, and are symmetric about the deflector 2. Therefore, for the sake of simplicity, a description is provided of the right station.

The deflector 2 deflects the light beam emitted from the light source 21a and 21b to scan the surface of the photoreceptors 12a, 12b, 12c, and 12d.

Figure 2:
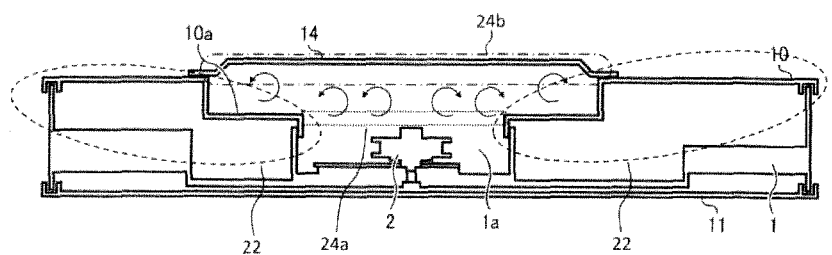
FIG. 2 is a cross-sectional view of a recessed portion of a first cover, having a symmetric shape in a main scan direction relative to a scan lens, according to an illustrative embodiment of the present invention.

The optical elements and the deflector 2 are disposed in the optical casing 1. As illustrated in FIG. 2, the optical casing 1 includes an upper opening 22 and a deflector compartment 1a serving as a deflector mounting portion. Further, the optical casing 1 occupies an optical element mounting portion 23 that is the space other than the deflector compartment 1a.

The upper opening 22 of the optical casing 1 is covered with the cover 10. The deflector compartment 1a is surrounded by walls including at least one transparent plate, in this case, the soundproof glasses 3a and 3a. The deflector 2 is provided to the deflector compartment 1a. The light sources 21a and 21b, and other optical elements are provided to the optical element mounting portion 23.

The deflector 2 is fastened to the optical casing 1. The deflector 2 is surrounded by the soundproof glasses 3a and 3b, and the walls. The soundproof glasses 3a and 3b are provided in the paths for incident beams from the light sources 21a and 21b and scan beams reflected by deflection mirrors of the deflector 2 so as to enable the scan beams to scan the scan lenses such as the fθ lenses 4a, 4b, 4c, and 4d.

The cover 10 serving as the first cover is provided to cover the upper opening 22 of the optical casing 1 of the optical scanner and shield optical elements against outside air. According to the illustrative embodiment, the bottom cover 11 is also provided to the optical scanner to shield the optical elements against outside air. However, because air heated by the deflector 2 travels upward, it is more effective to implement the cover ID in the optical scanner.

The cover 10 covers the upper opening 22 of the casing and includes a recessed portion 10a recessed toward the bottom of the optical casing I. The bottom of the recessed portion 10a facing the deflector 2 includes an opening serving as a first opening 24a.

The recessed portion 10a and the walls of the deflector compartment la are directly or indirectly connected so as to form a single continuous space and isolate the deflector compartment la from the optical element mounting portion 23 in the optical casing 1. The recessed portion 10a and the deflector compartment la communicate via the opening of the recessed portion 10a.

With this configuration, the single continuous space formed by the recessed portion 10a and the deflector compartment la is shielded against outside air of the optical scanner and isolated from the optical element mounting portion 23. Thus, hot airflow generated and spread by the deflection mirrors of the deflector 2 does not directly strike other optical elements, thereby preventing degradation of optical characteristics.

Furthermore, together with the recessed portion 10a of the cover 10, the deflector compartment 1a can provide a relatively large space that cannot be secured by the optical casing itself. Accordingly, heat generated by the polygon scanner 2 is spread into the large space of the recessed portion 10a. Accordingly, local elevation of temperature in the vicinity of the deflector 2 is prevented, and a good operating environment for the deflector 2 can be maintained.

With this configuration, hot airflow is prevented from spreading in the optical scanner and local elevation of temperature around the deflector 2 can be reduced, if not prevented entirely. Furthermore, foreign substance is prevented from sticking to the deflection mirrors. As a result, the optical characteristics are prevented from degrading, making it possible to obtain a desirable latent image and thus a high-quality image for an extended period of time.

The recessed portion 10a formed in the cover 10 is less likely to interfere with arrangement of optical elements to be mounted in the optical scanner, thereby providing greater flexibility when designing the shape of the recessed portion. For example, it is possible to secure a space in a direction perpendicular to an optical axis of the scan lens or substantially at the upper portion of the scan lens. Furthermore, when the cover 10 includes the recessed portion 10a, the recessed portion 10a can be larger than the deflector compartment 1a of the optical casing 1. Accordingly, the temperature of the deflector 2 is prevented from rising.

Although advantageous, in the optical scanner, heat is dissipated from the recessed portion 10a of the cover 10. In this case, the optical elements such as the scan lenses in the optical scanner are heated, causing the optical characteristics to change.

In a case of the scan lenses, when the temperature varies in the main scan direction, an irradiation position of the scan beam fluctuates unevenly in the main scan direction, causing degradation of image quality such as deviation of an error in an image magnification and color drift.

Furthermore, when the temperature of the scan lenses of the left and right stations deviates from one another, magnification of the left and right stations also deviates. Consequently, color drift may occur on the image.

In the optical scanner using the symmetrical scan method, when a temperature distribution of the left and the right stations exhibits point symmetry with the deflector 2 at the center, reverse deviation of magnification error may occur in the main scan direction in the left and the right stations, causing significant degradation of image quality.

As described above, as illustrated in FIG. 2, since there is greater flexibility in designing the shape of the recessed portion 10a of the cover 10, the temperature deviation in the main scan direction of the scan lenses can be reduced by forming the recessed portion 10a substantially symmetrical in the main scan direction relative to the scan lenses.

Furthermore, as illustrated in FIG. 2, when the recessed portion 10a has a shape substantially symmetric about the center of the deflector 2 in the optical axis direction of the scan lenses, the temperature deviation of the scan lenses of both the left and the right stations can be reduced. Accordingly, the temperature deviation of the scan lenses in the main scan direction as well as the temperature deviation of the left and the right stations can be reduced, thereby maintaining imaging quality, that is, maintaining magnification and preventing color drift.

It is desirable that the connecting portion of the cover 10 and the deflector compartment of the optical casing 1 be tightly connected so as to prevent air from leaking therefrom.

Figure 3:
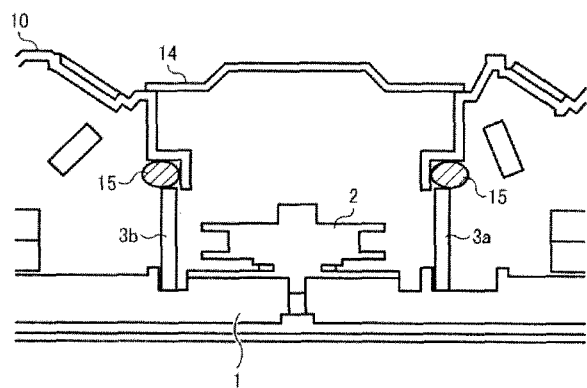
FIG. 3 is an enlarged view of a connecting portion of the first cover and a casing of the optical scanner, provided with a sealing member, according to an illustrative embodiment of the present invention.

One example of such configuration is illustrated in FIG. 3. FIG. 3 is an enlarged view of a connecting portion of the cover 10 and the optical casing 1, according to the illustrative embodiment.

In FIG. 3, sealing members 15 are provided to the connecting portion of the cover 10 and the optical casing 1. The sealing members 15 prevent heated air from leaking from the connecting portion into the optical scanner. Furthermore, foreign substance can be prevented from getting inside through the connecting portion, thereby preventing contamination of the deflection mirrors.

Normally, material that forms the cover 10 is different from the material that forms the optical casing 1. Thus, coefficients of linear expansion of the cover and the optical casing 1 are also different. When fastening the cover 10 to the optical casing 1, in particular, when fastening the cover 10 to the optical casing 1 by common screws in the vicinity of the deflector 2, the cover 10 and the optical casing 1 are heated by the heat generated as the deflector 2 rotates. The difference in the coefficients of the linear expansion causes the cover 10 and the optical casing 1 to deform.

In particular, when the optical casing 1 deforms, relative positions of the optical elements in the optical casing 1 change, thereby adversely affecting the optical characteristics. When the cover 10 deforms, the cover 10 does not properly cover the optical casing 1. If a gap is undesirably formed between the cover 10 and the optical casing 1, foreign substance gets into the optical scanner from outside, and hot air leaks from the deflector compartment 1a into the space where the optical elements are disposed. When this happens, the optical elements are undesirably heated, thereby degrading the optical characteristics.

Figure 4:
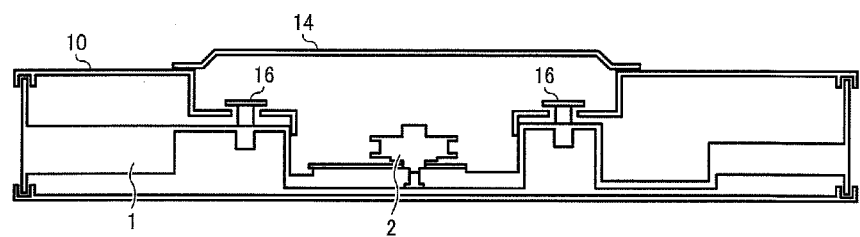
FIG. 4 is a cross-sectional view of the first cover fastened to a casing by a shoulder screw, according to an illustrative embodiment of the present invention.
Figure 5:
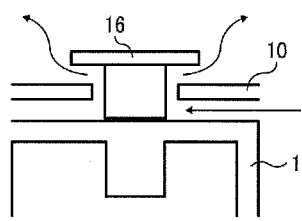
FIG. 5 is an enlarged view of the shoulder screw fastening the cover of FIG. 4.

In view of the above, as illustrated in FIG. 4, shoulder screws 16 are used to fasten the cover 10 to the optical casing 1. FIG. 4 is a cross-sectional view illustrating the cover 10 fastened to the optical casing 1 by the shoulder screws 16. The shoulder screws 16 absorb the difference in the linear expansion of the cover 10 and the casing 1 when the temperature fluctuates. Accordingly, deformation of the cover 10 and the optical casing 1 is prevented.

However, a slight gap formed between the shoulder screws 16 and the cover 10 may suffer from a drawback in that, air travels between inside and outside the deflector compartment 1a. Heated air in the deflector compartment 1a leaks into the optical element mounting portion 23 of the optical scanner, thereby undesirably heating other optical elements and thus degrading the optical characteristics. Furthermore, foreign substance gets into the deflector compartment 1a from outside so that the foreign substance sticks to the deflection mirrors, thereby degrading reflectivity.

Figure 6:
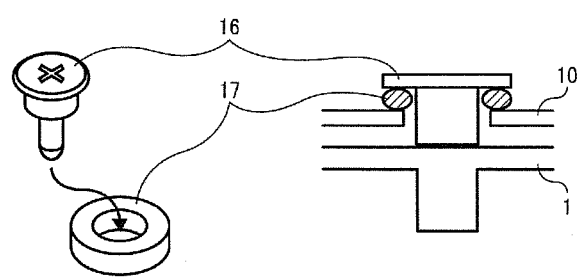
FIG. 6 is a schematic diagram illustrating the shoulder screw provided with a sealing member, according to an illustrative embodiment of the present invention.

To address such problems, as illustrated in FIG. 6, a sealing member 17 is provided to the shoulder screw 16 to fill the gap between the shoulder screw 16 and the cover 10. FIG. 6 is an enlarged view of the shoulder screw 16 provided with the sealing member 17.

Referring back to FIG. 1, the configuration shown in FIG. 1 includes a second cover 14 to cover a second opening 24b provided to the cover 10. Through the second opening 24b, the optical scanner communicates the outside thereof.

With this configuration, maintenance such as checking and replacement of the deflector 2 can be performed without removing the cover 10. Instead, the deflector 2 can be accessed by only removing the second cover 14, thereby enhancing maintainability of the optical scanner.

When material having high thermal conductivity is used for the second cover 14, heat dissipation efficiency of heat in the deflector compartment isolated by the second cover 14 from the outside is enhanced even more.

Alternatively, a fan, not illustrated, can be provided to blow air substantially above the second cover 14, thereby increasing the efficiency in heat dissipation. Accordingly, local elevation of temperature in the vicinity of the deflector 2 is prevented, and a good operating environment for the deflector 2 can be maintained.

Figure 7:
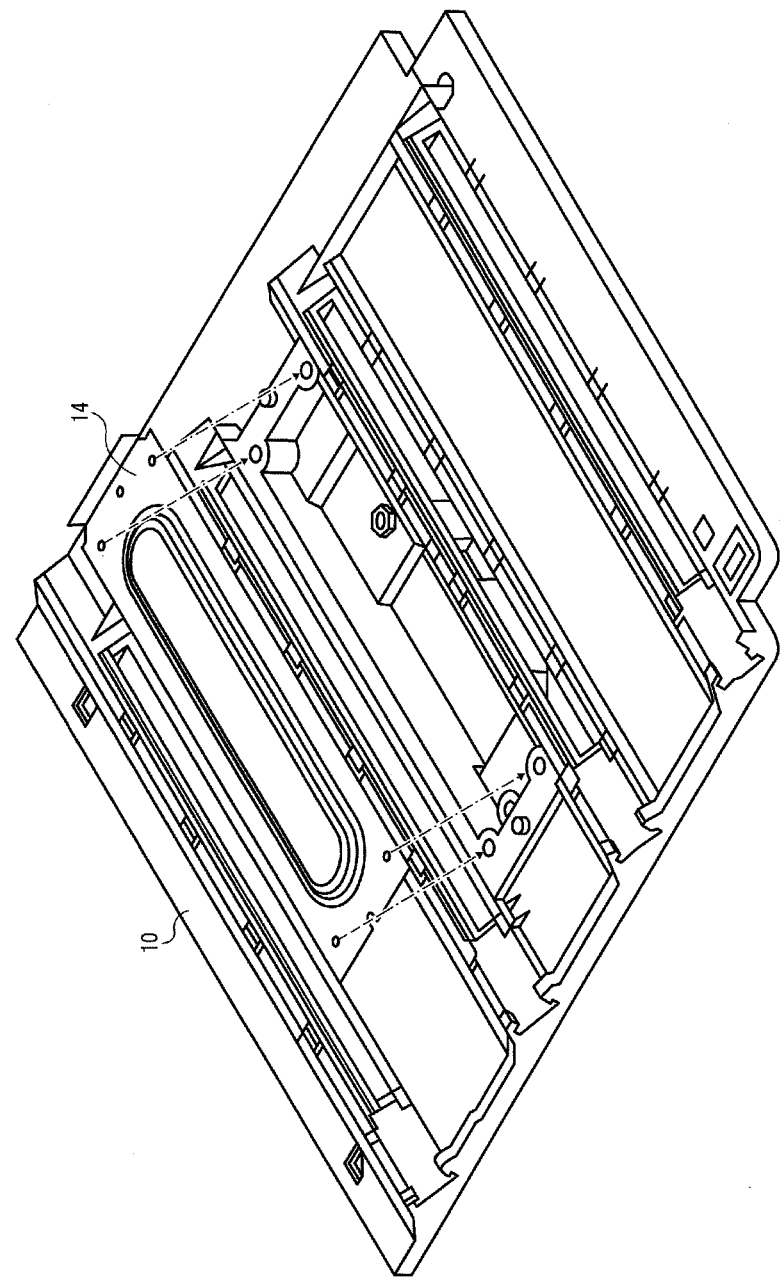
FIG. 7 is a schematic diagram illustrating a second cover fastened to the first cover, according to an illustrative embodiment of the present invention.

Referring now to FIG. 7, there is provided a diagram schematically illustrating installation of the second cover 14 relative to the cover 10. FIG. 7 is a schematic diagram illustrating the second cover 14 fastened to the cover 10.

In FIG. 7, the second cover 14 is fastened to the cover 10 by screws or the like. With this configuration, when the cover 10 is removed, the second cover 14 can also be removed so as to facilitate maintenance of the optical scanner, thereby improving maintainability. In addition, as described above, only the second cover 14 can be removed to perform maintenance. This means that depending on necessity, whether the cover 10 together with the second cover 14 is removed or only the second cover 14 is removed can be selected.

Figure 8:
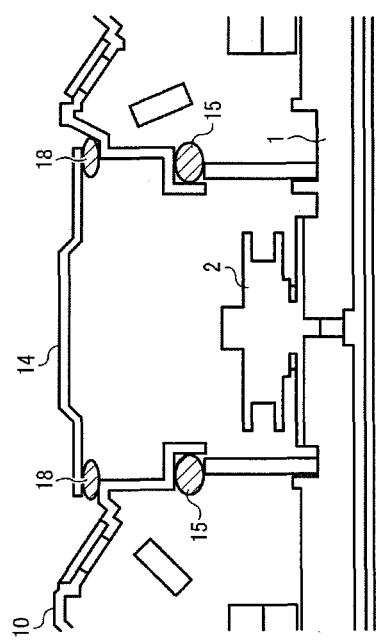
FIG. 8 is a cross-sectional view of a sealing member provided between the first cover and the second cover, according to an illustrative embodiment of the present invention.

As illustrated in FIG. 8, a sealing member 18 is provided between the cover 10 and the second cover 14 so as to enhance sealing ability of the deflector compartment 1a. FIG. 8 is a cross-sectional view of the cover 10 and the second cover 14 provided with the sealing member 18 therebetween, With this configuration, undesirable foreign substance is prevented from getting inside from outside the optical scanner and sticking to the deflection mirrors. Therefore, the deflective mirrors can maintain desirable reflection so that a high-quality image can be output for an extended period of time.

Figure 9B:
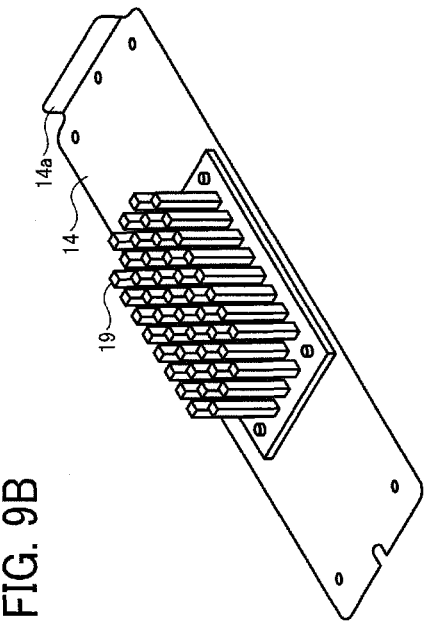
FIGS. 9A and 9B are schematic diagrams illustrating the second cover having concavo-convex shape, according to an illustrative embodiment of the present invention.
Figure 9A:
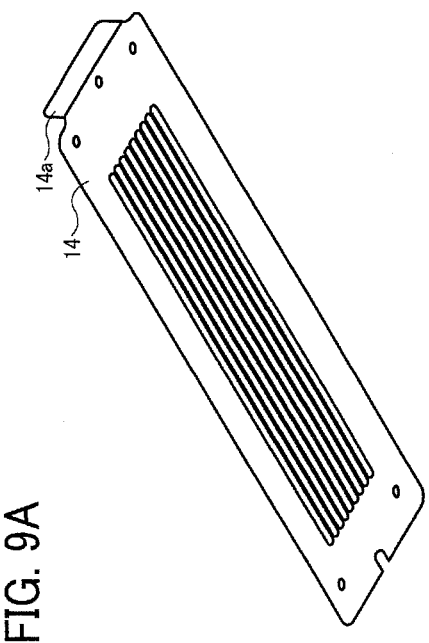
Figure 10:
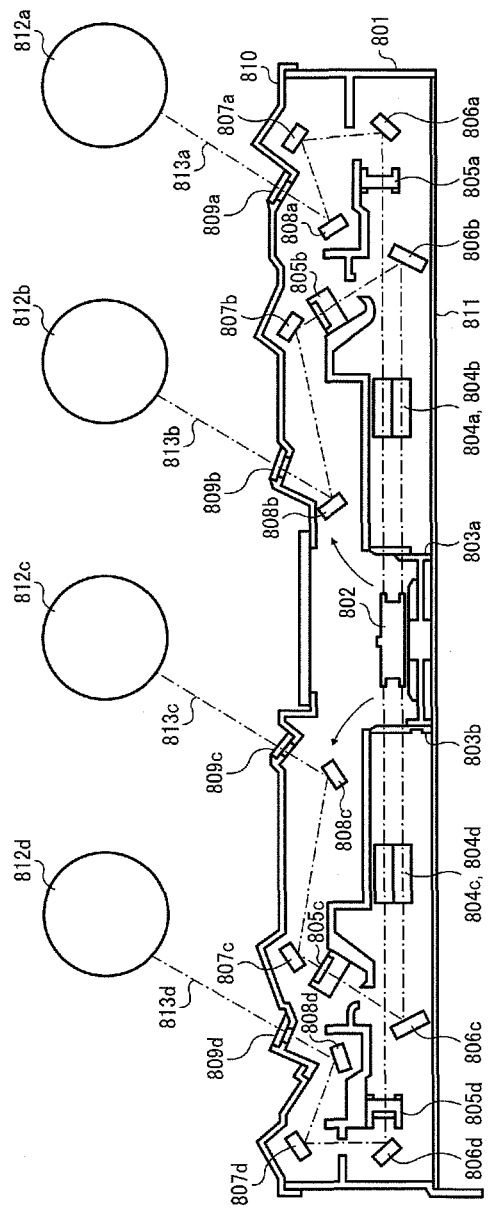
FIG. 10 is a cross-sectional view of an example of a related-art optical scanner.
Figure 11:
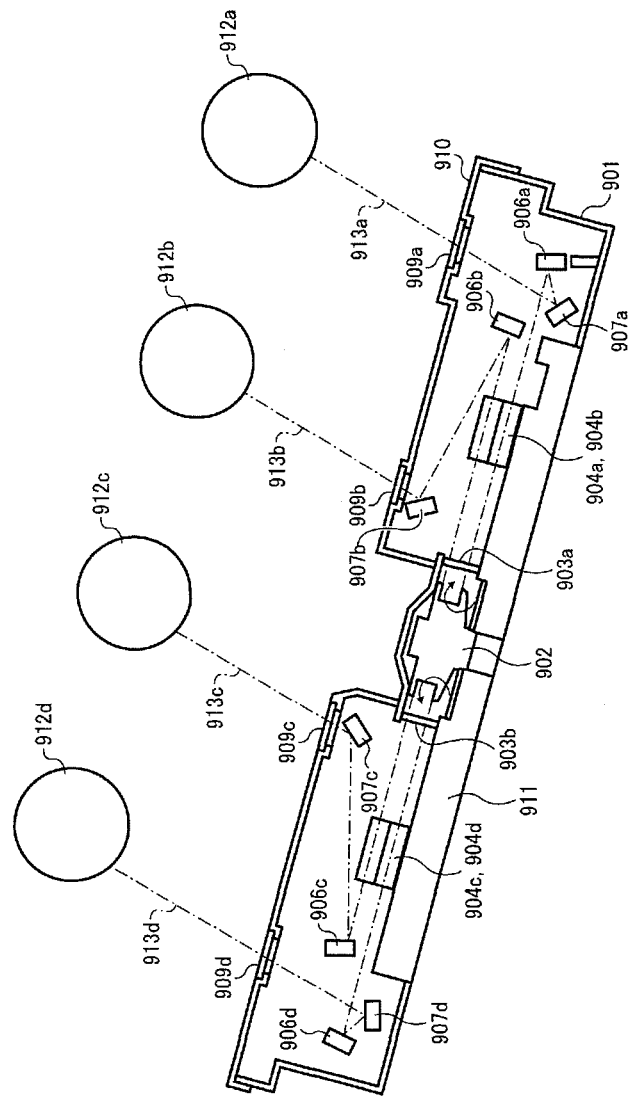
FIG. 11 is a cross-sectional view of another example of a related-art optical scanner.

According to the illustrative embodiment, it is preferable that the second cover 14 has a plate-like shape including a concavo-convex portion to enhance heat dissipation. FIG. 9A illustrates the second cover 14 including the concavo-convex portion. FIG. 9B illustrates the second cover 14 including a heat dissipation member 19 such as a heat sink. With this configuration, heat inside the deflector compartment can be dissipated outside through the second cover 14 with ease.

The concavo-convex portion or the heat dissipation member 19 are provided in the thickness direction of the second cover 14. Accordingly, stiffness thereof can be enhanced.

Though not illustrated, a fan or the like can be provided to blow air against the vicinity of the second cover 14, thereby enhancing dissipation of heat.

According to the illustrative embodiment, when the second cover 14 includes the concavo-convex portion or the heat sink 19, stiffness of the second cover 14 can be reliably maintained so that it is possible to prevent the second cover 14 from vibrating sympathetically with vibration of the deflector and other devices. As a result, the second cover 14 does not generate noise.

In a case where the second cover 14 is formed of sheet metal, the concavo-convex portion or the heat sink 19, are formed by bending, drawing, and so forth. Alternatively, the concavo-convex portion or the heat sink 19 can be individually formed and attached to the second cover 14 by caulking or welding.

Even if dissipation of heat is not necessary, when at least one projection 14a is provided to the second cover 14, the projection 14a can be used as a handle to hold upon removal of the second cover 14, thereby facilitating maintenance operation. At least one projection 14a can be provided substantially at an end portion of the second cover 14.

Figure 12:
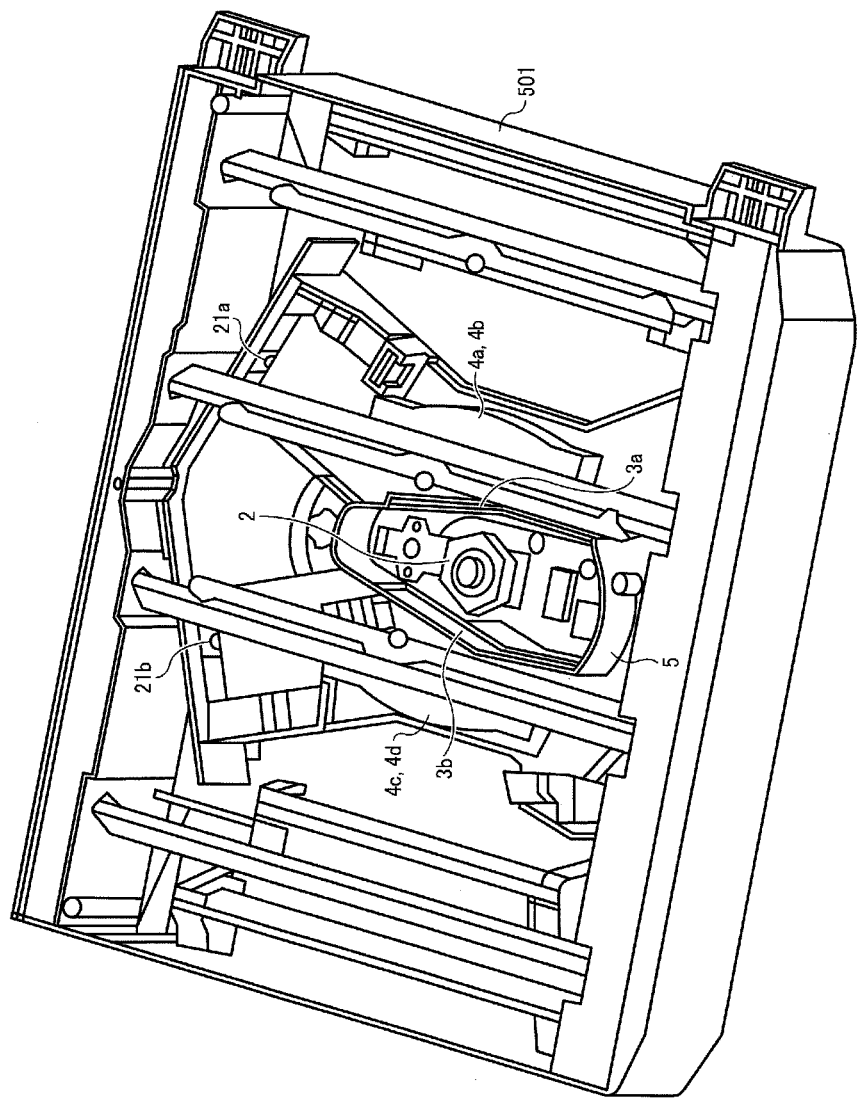
FIG. 12 is a perspective view illustrating an optical scanner, according to another embodiment of the present invention.

Referring now to FIG. 12, a description is provided of another embodiment of the present invention. FIG. 12 is a perspective view of the optical scanner according to another embodiment of the present invention. The optical scanner uses the symmetrical scan method and is employed in the tandem-type full-color image forming apparatus.

The optical scanner includes the deflector 2 substantially at the center thereof. The deflector 2 is fastened to an optical casing 501. The walls 5 are provided around the mounting portion of the polygon scanner 2 except for the paths for incident beams from the light sources 21a and 21b and the scan beams reflected by deflection mirrors of the deflector 2. The soundproof glasses 3a and 3b are provided to the paths for the scan beams reflected by the deflection mirrors so as to deflect desirable scan light against scan lenses such as the fθ lenses 4a through 4d.

Figure 13:
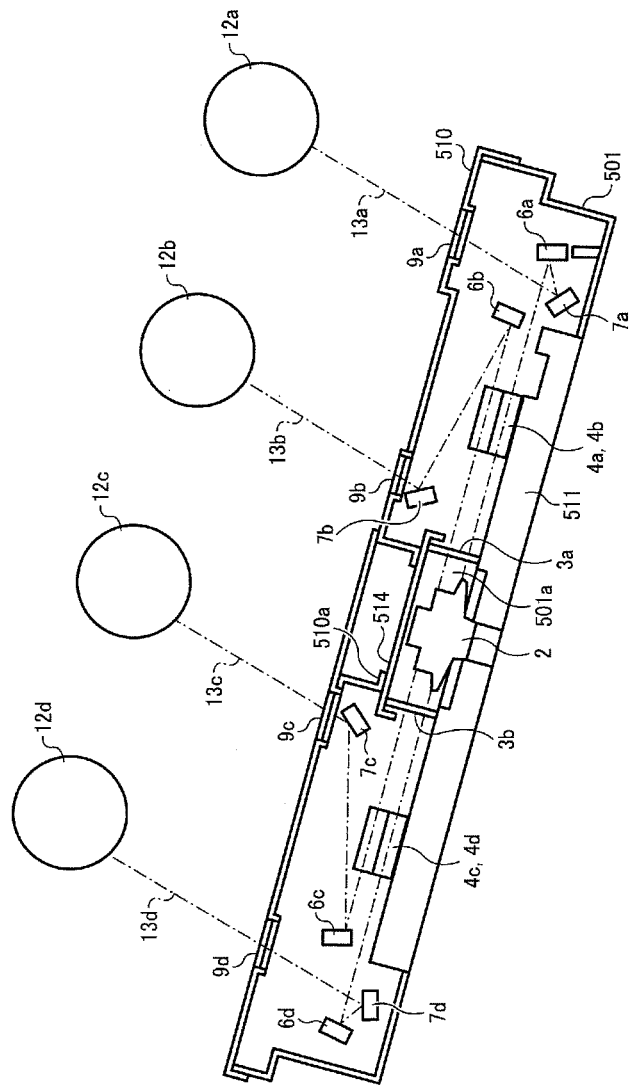
FIG. 13 is a cross-sectional view of the optical scanner, according to an illustrative embodiment of the present invention.

Referring now to FIG. 13, there is provided a cross-sectional view of the optical scanner of FIG. 12. A cover 510 serving as a first cover as well as a top cover is provided to the optical scanner to shield the optical elements against the outside air. The cover 510 includes the dustproof glasses 9a, 9b, 9c, and 9d while securing the optical path 13a, 13b, 13c, and 13d leading to the photoreceptors 12a, 12b, 12c, and 12d, respectively.

According to the illustrative embodiment, a lower cover 511 is provided at the bottom of the optical scanner. Alternatively, the cover 510 may be also applied as a lower cover. However, because air heated by the deflector 2 travels upward, it is more effective to implement the cover 510 as a top cover in the optical scanner. The cover 510 includes a recessed portion 510a. The surface of the recessed portion 510a that faces the deflector 2 has an opening.

According to the present invention, the optical scanner includes an intermediate member 514 including a third opening 24c. The deflector compartment 501a of the optical casing 501 and the recessed portion 510a of the cover 510 communicate via the opening of the recessed portion of the cover 510 and the opening 24c of the intermediate member 514. Accordingly, the deflector compartment 501a of the optical casing 501 is shielded against air in the optical scanner.

The deflector compartment 501a of the optical casing 501 is isolated from other optical elements such as the fθ lenses 4a through 4d, the first mirrors 6a through 6d, and the second mirrors 7a through 7d, by the walls 5a and 5b, the soundproof glasses 3a and 3b, and the intermediate member 514. Accordingly, hot airflow spread by the deflection mirrors of the deflector 2 is prevented from contacting the optical elements, thus preventing degradation of optical characteristics.

With this configuration, heat generated by the deflector 2 spreads in large space formed by the cover 510 and the optical casing 501 through the openings of the intermediate member 514 and the recessed portion 510a of the cover 510, thereby preventing local temperature elevation in the vicinity of the deflector 2 and maintaining good operating environment for the deflector 2.

Because more compact image forming apparatuses are appreciated in recent years, it is necessary to reduce the size of the optical scanner to be employed in such image forming apparatuses. In order to satisfy such a demand, it is necessary to reduce the size of space in the optical scanner. In such a case, the optical elements are often disposed between the cover 510 and the optical casing 501, complicating efforts to secure space that is isolated from the optical element mounting portion and allows hot air to travel therein.

In view of the above, according to the illustrative embodiment, the intermediate member 514 provides greater flexibility in designing a shape of the sealing space for the deflector 2.

Furthermore, because the intermediate member 514 is fastened to the optical casing 501, stiffness of the optical casing 501 is enhanced. Accordingly, banding in an image caused by vibration of the deflector 2 as the deflector 2 rotates is reduced, if not prevented entirely. The banding is a phenomenon in which unevenness of image concentrations occurs.

Moreover, when thermal conductivity the intermediate member 514 is greater than that of the cover 510 and the optical casing 501, heat dissipation can be enhanced even more, preventing rise in the temperature of the mounting environment for the deflector 2.

Still further, when the thermal conductivity of the material of the intermediate member 514 is greater than that of the material forming the cover 510 and the optical casing 501, a temperature distribution of the cover 510 and the optical casing 501 is made uniform, preventing degradation of optical characteristics due to the temperature deviation in the deflector compartment for the deflector 2.

With the configuration described above, hot air is prevented from spreading in the optical scanner, local elevation of the temperature in the vicinity of the deflector 2 is prevented, and foreign substance is prevented from sticking to the deflection mirrors. As a result, the optical characteristics are prevented from degrading, making it possible to obtain a desirable latent image and thus a high-quality image for an extended period of time.

Figure 14:
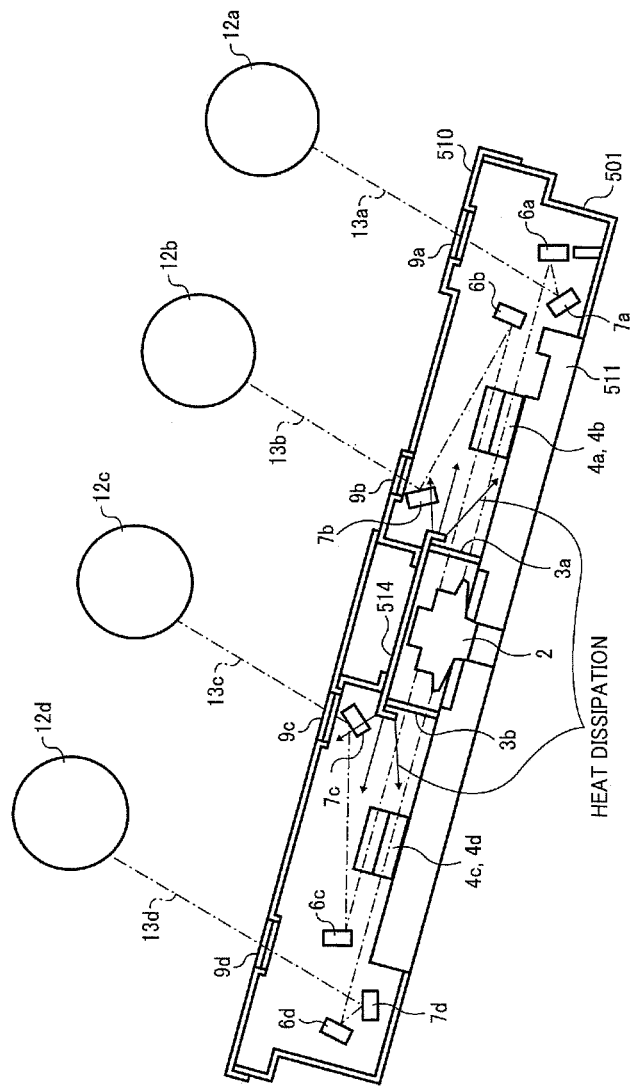
FIG. 14 is a cross-sectional view of the optical scanner conceptually showing movement of heat in the optical scanner.
Figure 15:
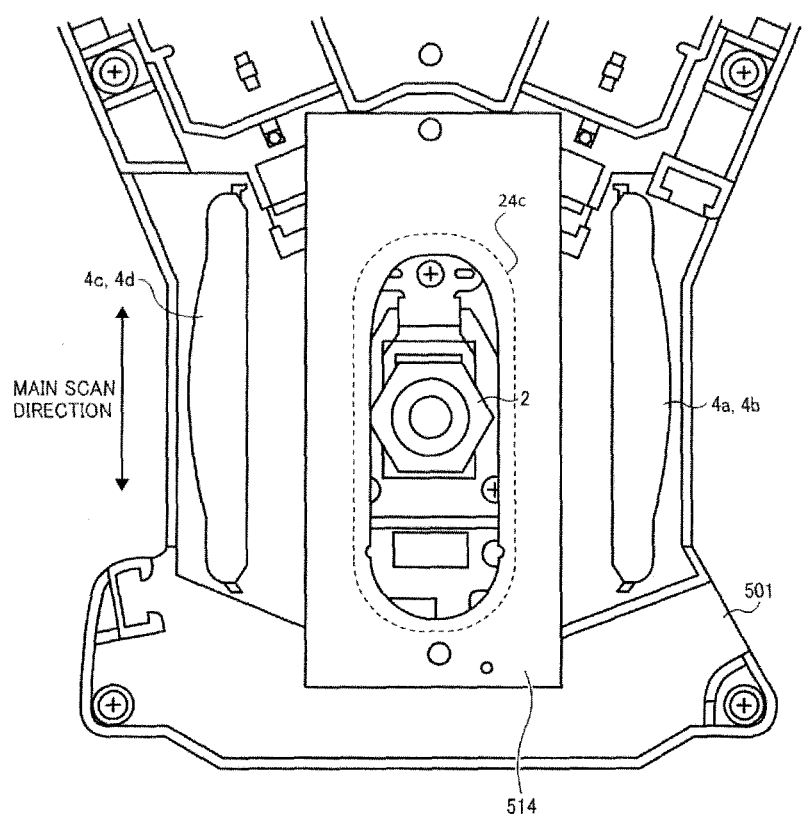
FIG. 15 is a partially enlarged view of the optical scanner including an intermediate member according to another embodiment of the present invention.

Referring now to FIGS. 14 and 15, a description is provided of another embodiment of the present invention. FIG. 14 is a diagram schematically illustrating heat traveling in the optical scanner. FIG. 15 is a partially enlarged view of the optical scanner including the intermediate member 514 according to another embodiment of the present invention.

As illustrated in FIG. 14, in the optical scanner, heat is dissipated through the intermediate member 514. In this case, the optical elements such as the scan lenses 4a and 4b are heated, degrading optical characteristics.

In a case of the scan lenses 4a and 4b, in particular, when the temperature or the temperature gradient varies in the main scan direction, an irradiation position of the scan beams fluctuates unevenly in the main scan direction, causing degradation of image quality such as deviation of an error in an image magnification and color drift.

Furthermore, when the temperature of the scan lenses of the left and the right stations deviates from one another, magnification of the left and right stations also deviates, causing color drift on the image.

In the optical scanner using the symmetrical scan method, when a temperature distribution of the left and the right stations exhibits point symmetry with the deflector 2 at the center, reverse deviation of magnification error may occur in the main scan direction in the left and the right stations, causing significant degradation of image quality.

To counteract such a difficulty, as illustrated in FIG. 15, the intermediate member 514 capable of dissipating heat has a substantially symmetrical shape in the main scan direction relative to the scan lenses 4a and 4b as well as the scan lenses 4c and 4d. Accordingly, the temperature deviation in the main scan direction can be reduced.

Figure 16:
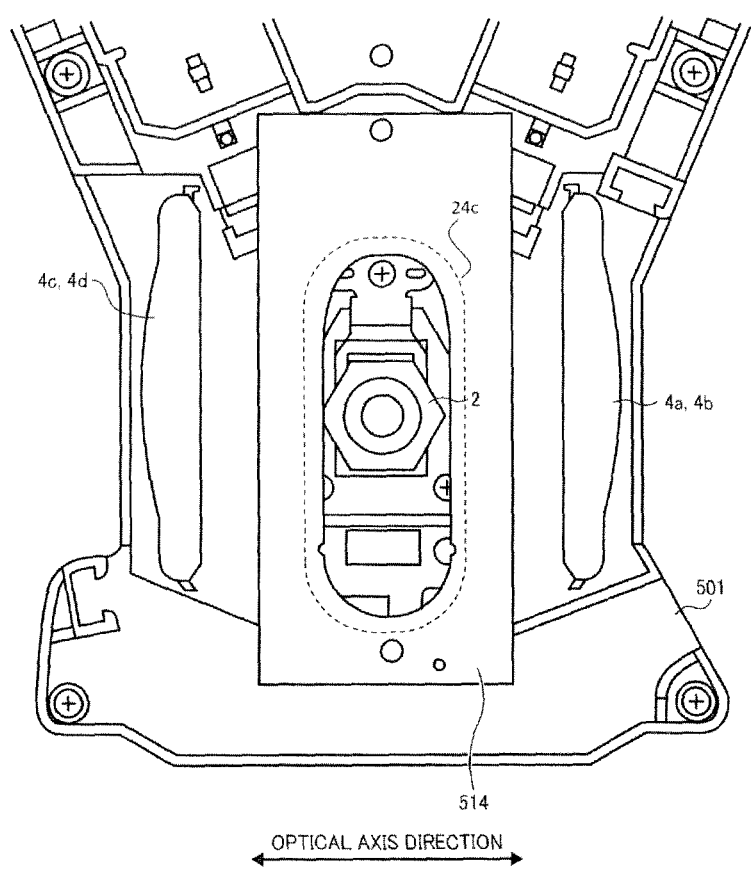
FIG. 16 is a schematic diagram illustrating the intermediate member.

As illustrated in FIG. 16, the optical scanner according to the present embodiment is substantially symmetric about the deflector 2 at the center in the optical axis direction of the scan lenses 4a and 4b, and 4c and 4d, thereby reducing the temperature deviation of the scan lenses of the left and the right stations and thus maintaining imaging quality, that is, maintaining magnification, preventing color drift, and so forth.

Figure 17:
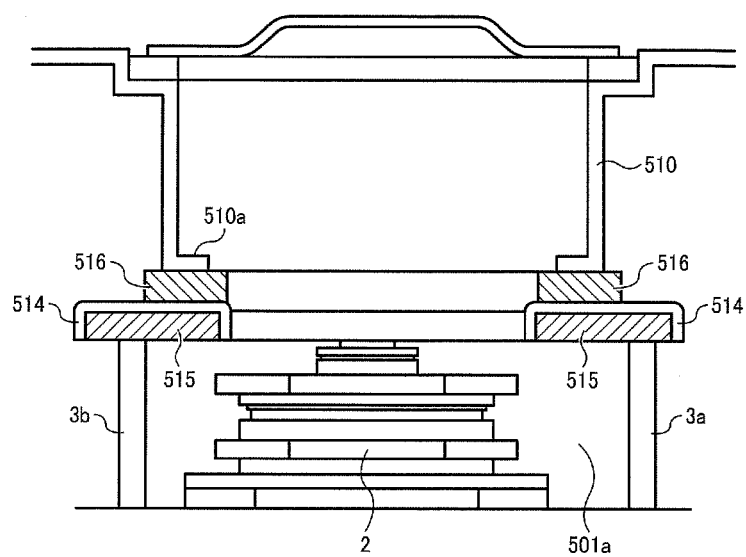
FIG. 17 is a partially enlarged view of the optical scanner, according to still another embodiment of the present invention.

Referring now to FIG. 17, there is provided another embodiment of the present invention. FIG. 17 is a partially enlarged view of the optical scanner according to another embodiment of the present invention.

It is preferable that connecting portions of the recessed portion 510a of the cover 510, the deflector compartment 501a of the optical casing 501, and the intermediate member 514 do not allow air to leak as much as possible.

In view of the above, according to the present embodiment, a sealing member 515 is provided between the intermediate member 514 and the optical casing 501, and a sealing member 516 is provided between the intermediate member 514 and the cover 510. Accordingly, heated air is prevented from leaking into the optical scanner through the connecting portions, and foreign substance is prevented from getting inside. Thus, contamination of deflection mirrors of the deflector 2 can be prevented.

According the present embodiment, the sealing members 515 and 516 are provided between the intermediate member 514 and the optical casing 501, and between the intermediate member 514 and the cover member 510, respectively. Alternatively, the sealing member can be provided either between the intermediate member 514 and the optical casing 501 or between the intermediate member 514 and the cover member 510. Even if one of the sealing members 515 and 516 is provided, hot air is prevented from leaking and contamination of deflection mirrors is also prevented.

Figure 18:
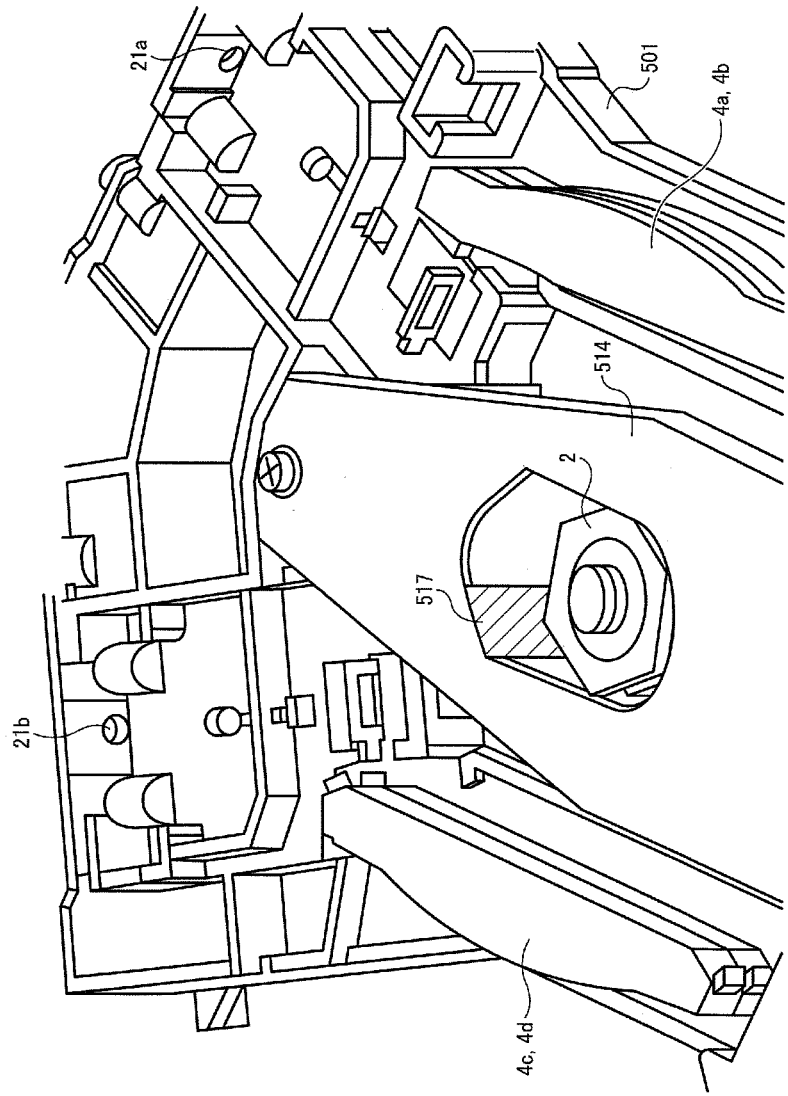
FIG. 18 is a partially enlarged view of the optical scanner, according to yet still another embodiment of the present invention.

Referring now to FIG. 18, there is provided a partially enlarged view of the optical scanner according to another embodiment of the present invention.

In the optical scanner using the symmetrical scan method, it is known that reflected light (flair light) generated by the scan lens surfaces enters the opposing station. The flair light reflected and entered the opposing station is focused onto the photoreceptor. As a result, an image is formed on a place where there is no image data on the photoreceptor, causing an abnormal image such as an image with irregular color concentration.

In view of the above, as illustrated in FIG. 18, the intermediate member 514 includes a flair light shield member 517 provided at the opening thereof to shield against the flair light generated from the scan lenses 4a and 4b, and the scan lenses 4c and 4d. The flair light shield member 517 is a plate member extending downward from the end portion of the opening. Accordingly, generation of an abnormal image due to flair light is prevented. The flair light shield member 517 is provided at a place where optical scanning is not necessary to perform. For example, the flair light shield member 517 is provided between the light source 21a and the light source 21b.

Figure 19:
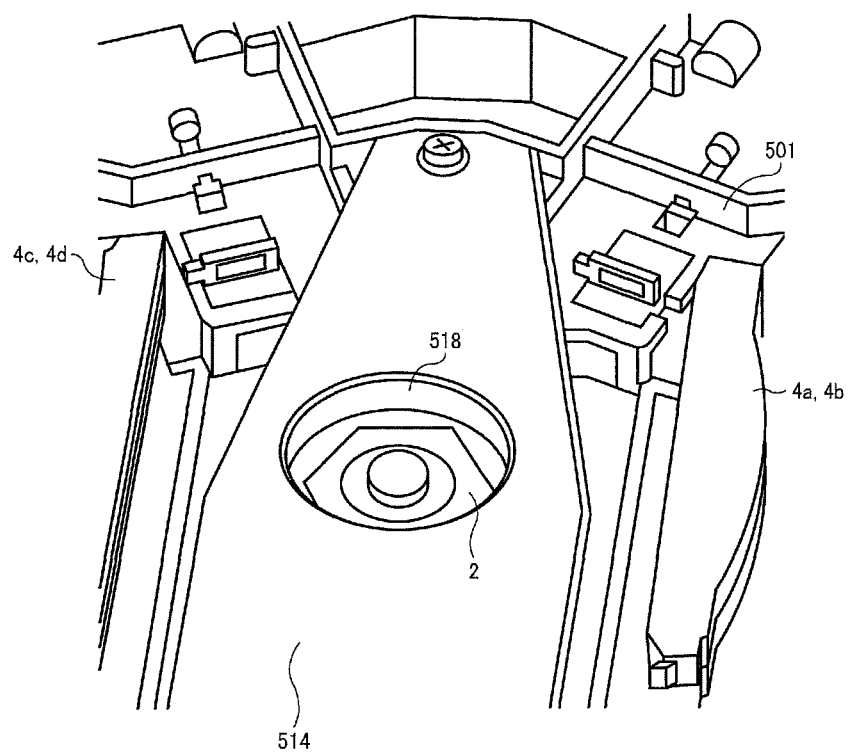
FIG. 19 is a partially enlarged view of the optical scanner, according to yet still another embodiment of the present invention.

Referring now to FIG. 19, there is provided a partially enlarged view of the optical scanner according to another embodiment of the present invention.

Normally, when the deflector 2 is operated, the deflector 2 rotates at high speed while the deflection mirrors of the deflector 2 receive strong air pressure. This windage hinders rotation of the deflector 2, thereby increasing power consumption and thus causing rise in the temperature.

Furthermore, undesirable noise, such as wind noise is generated at the edge of the deflection mirrors during operation of the image forming apparatus.

As the number of rotation of the deflector 2 increases, an effect of airflow thereon increases when the deflector 2 rotates, causing various adverse effects as described above.

In order to counteract such problems, as illustrated in FIG. 19, the intermediate member 514 of the present embodiment includes an airflow adjuster 518 that rectifies airflow so that the intermediate member 514 serves as an airflow adjuster.

When the deflector 2 is a rotary member and a polygon scanner, it is preferable that the airflow adjuster 518 have a cylindrical surface, the center of which substantially coincides with the rotation axis of the deflector 2. In other words, the surface of the airflow adjuster 518 is smooth and formed at an equal distance from the rotation axis of the deflector 2.

With this configuration, when the deflector 2 rotates at high speed, the windage on the deflection mirrors is significantly reduced. Accordingly, power consumption can be reduced significantly, and rise in the temperature is also reduced, thereby reducing undesirable noise.

In addition, the intermediate member 514 can include both the airflow adjuster and the flair light shield member 517. In this case, the flair light shield member 517 can be provided to the place where optical scanning is not necessary.

As described above, the intermediate member 514 is fastened to the optical casing 501 so as to increase stiffness of the optical casing 501. In the optical scanner according to another embodiment, the cover 510 and the intermediate member 514 are fastened together, thereby reducing the number of parts to be used and thus reducing cost of assembly as a whole.

Figure 20:
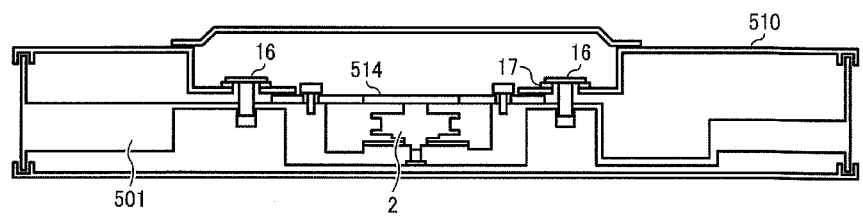
FIG. 20 is a cross-sectional view of the optical scanner, according to yet still another embodiment of the present invention.
Figure 21:
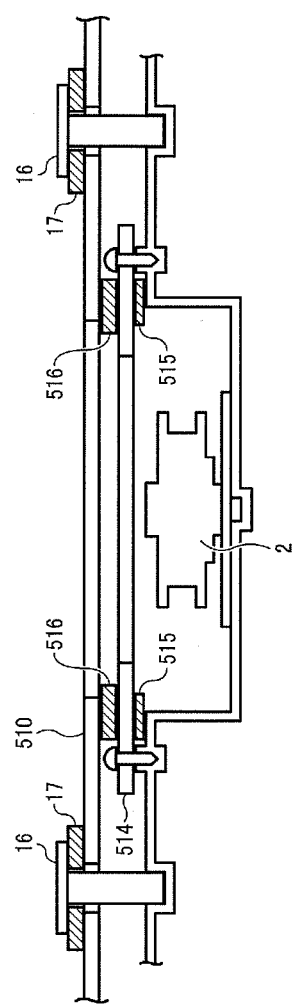
FIG. 21 is a partially enlarged view of FIG. 20.
Figure 22:
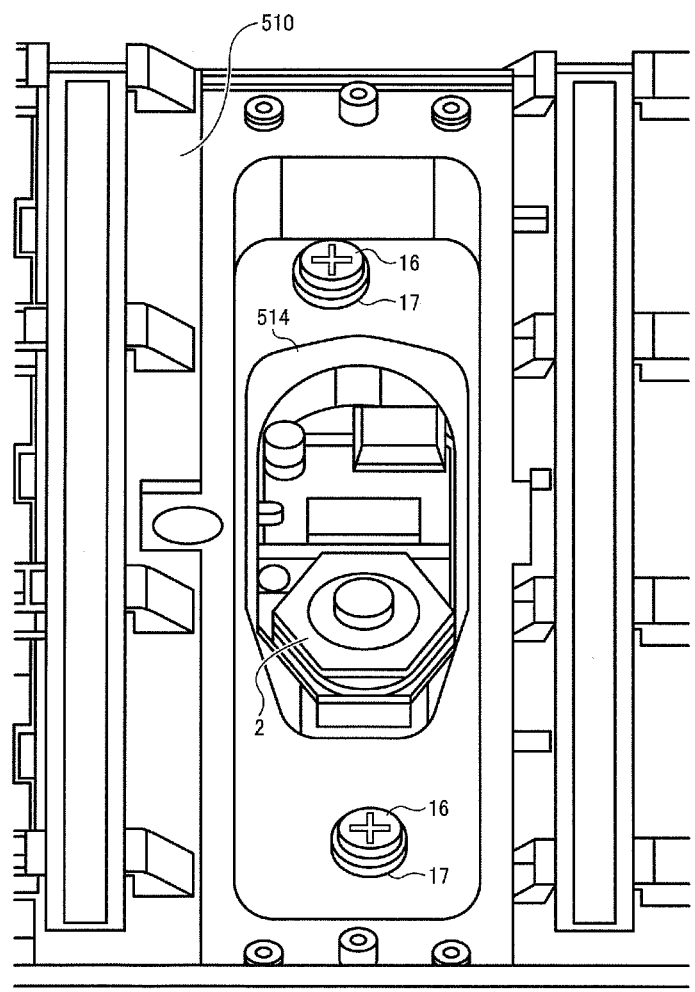
FIG. 22 is a top view of FIG. 21.

Referring now to FIG. 20, there is provided a partially enlarged view of the optical scanner according to another embodiment of the present invention. A detailed configuration of the present embodiment is shown in FIGS. 21 and 22. FIG. 21 is a partially enlarged view of FIG. 20. FIG. 22 is a top view of the optical scanner.

Normally, material for the cover 510 is not the same as the material for the optical casing 501. Thus, coefficients of linear expansion of the cover 510 and the optical casing 501 are not the same.

When fastening the cover 510 to the optical casing 501, in particular, when fastening the cover 510 to the optical casing 501 by common screws in the vicinity of the deflector 2, the cover 510 and the optical casing 501 are heated by the heat generated by rotation of the deflector 2, causing deformation of the cover 510 and the optical casing 501. The difference in the coefficients of the linear expansion causes the cover 510 and the optical casing 501 to deform.

In particular, when the optical casing 501 deforms, relative positions of the optical elements in the optical casing 501 change, thereby adversely affecting the optical characteristics. When the cover 510 deforms, the cover 510 does not properly cover the optical casing 501. If a gap is undesirably formed between the cover 510 and the optical casing 501, foreign substance gets into the optical scanner, and hot air leaks from the deflector compartment 510a. When this happens, the optical elements are undesirably heated so that it is possible to degrade optical characteristics.

In view of the above, according to the present embodiment as illustrated in FIG. 20, the shoulder screws 16 are used to fasten the cover 510 to the optical casing 501.

As illustrated in FIG. 21, the shoulder screws 16 can be provided with the sealing members 17 to enhance sealing between the shoulder screws 16 and the cover 510.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical comprising:
a light source to emit a light beam;
an optical element including a scan lens to convert the light beam into a desirable shape;
a deflector to deflect the light beam to scan a photoreceptor with the light beam;
a casing to house the light source, the optical element, and the deflector, the casing including an upper opening, walls including a transparent plate defining a deflector compartment to accommodate the deflector, and an optical element mounting portion to accommodate the light source and the optical element; and
a first cover to cover the upper opening of the casing, the first cover including a recessed portion recessed toward the bottom of the casing, the recessed portion including a bottom surface that extends outward from the walls of the deflector compartment and includes a first opening facing the deflector, wherein
the recessed portion of the first cover and the walls of the deflector compartment are directly or indirectly connected to define a single continuous space isolating the deflector compartment from the optical element mounting portion, and the recessed portion and the deflector compartment communicate via the first opening, and wherein
the single continuous space includes the deflector compartment and an upper portion that is above the bottom surface of the recessed portion, and wherein
the upper portion of the single continuous space above the bottom surface of the recessed portion has a volume that is greater than a volume of the deflector compartment and has a cross-sectional area, parallel to the bottom surface of the recessed portion, that is greater than a cross-sectional area, parallel to the bottom surface of the recessed portion, of the deflector compartment.

2. The optical scanner according to claim 1, wherein the recessed portion has a shape substantially symmetric relative to the scan lens in the main scan direction of the deflector.

3. The optical scanner according to claim 1, wherein the recessed portion has a shape substantially symmetric about a center of the deflector in a direction perpendicular to the main scan direction of the deflector.

4. The optical scanner according to claim 1, wherein the first cover is fastened to the casing by a shoulder screw, and a sealing member is provided between the first cover and the shoulder screw.

5. The optical scanner according to claim 1, further comprising a second cover,
wherein the recessed portion further includes a second opening at the top of the recessed portion opposite the first opening, and the second cover covers the second opening.

6. The optical scanner according to claim 5, wherein the second cover has a thermal conductivity greater than that of the first cover.

7. The optical scanner according to claim 5, wherein the second cover is fastened to the first cover.

8. The optical scanner according to claim 5, wherein second cover includes a heat dissipation member to increase heat dissipation.

9. The optical scanner according to claim 5, wherein the second cover has a plate-like shape and includes a concavo-convex shape in a thickness direction thereof.

10. The optical scanner according to claim 5, wherein the second cover includes at least one projection at the end portion thereof.

11. An optical scanner, further comprising:
a light source to emit a light beam;
an optical element including a scan lens to convert the light beam into a desirable shape;
a deflector to deflect the light beam to scan a photoreceptor with the light beam;
a casing to house the light source, the optical element, and the deflector, the casing including an upper opening, walls including a transparent plate defining a deflector compartment to accommodate the deflector, and an optical element mounting portion to accommodate the light source and the optical element;
a first cover to cover the upper opening of the casing, the first cover including a recessed portion recessed toward the bottom of the casing, the recessed portion including a bottom surface that extends outward from the walls of the deflector compartment and includes a first opening facing the deflector; and
an intermediate member provided between the deflector compartment and the recessed portion, the intermediate member including a third opening facing the first opening of the recessed portion,
wherein the recessed portion of the first cover and the walls of the deflector compartment are directly or indirectly connected to define a single continuous space isolating the deflector compartment from the optical element mounting portion, and the recessed portion and the deflector compartment communicate via the first opening, and
wherein the recessed portion of the first cover and the walls of the deflector compartment are connected by the intermediate member to define a single continuous space isolating the deflector compartment from the optical element mounting portion, and the deflector compartment and the recessed portion communicate via the first opening and the third opening.

12. The optical scanner according to claim 11, wherein the intermediate member is formed of a material having a higher thermal conductivity than that of the casing and the first cover.

13. The optical scanner according to claim 11, wherein the intermediate member has a shape substantially symmetric relative to the scan lens in the main scan direction.

14. The optical scanner according to claim 11, wherein the intermediate member has a shape substantially symmetric about the center of the deflector in a direction perpendicular to the main scan direction.

15. The optical scanner according to claim 11, wherein a pat of the intermediate member blocks flair light.

16. The optical scanner according to claim 11, wherein a part of the intermediate member adjusts airflow that is generated when the deflector s operated.

17. The optical scanner according to claim 11, wherein the intermediate member is fastened to the casing together with the first cover.

18. The optical scanner according to claim 11, further comprising a first sealing member between the intermediate member and the casing and a second sealing member between the intermediate member and the first cover.

19. An image forming apparatus for forming an image, comprising:
- an image bearing member to bear an electrostatic latent image on a surface thereof;
- a developing device to develop the electrostatic latent image formed on the image bearing member using toner to form a toner image;
- a transfer device to transfer the toner image onto a recording medium;
- a fixing device to fix the toner image; and
- an optical scanner including
    - a light source to emit a light beam;
    - an optical element including a scan lens to convert the light beam into a desirable shape;
    - a deflector to deflect the light beam to scan a photoreceptor with the light beam;
    - a casing to house the light source, the optical element, and the deflector, the casing including an upper opening, walls including a transparent plate defining a deflector compartment to accommodate the deflector, and an optical element mounting portion to accommodate the light source and the optical element; and
    - a first cover to cover the upper opening of the casing, the first cover including a recessed portion recessed toward the bottom of the casing, the recessed portion including a bottom surface that extends outward from the walls of the deflector compartment and includes a first opening facing the deflector,
- wherein the recessed portion of the first cover and the walls of the deflector compartment are directly or indirectly connected to define a single continuous space isolating the deflector compartment from the optical element mounting portion, and the recessed portion and the deflector compartment communicate via the first opening, and wherein
- the single continuous space includes the deflector compartment and an upper portion that is above the bottom surface of the recessed portion, and wherein
- the upper portion of the single continuous space above the bottom surface of the recessed portion has a volume that is greater than a volume of the deflector compartment and has a cross-sectional area parallel to the bottom surface of the recessed portion, that is greater than a cross sectional area, parallel to the bottom surface of the recessed portion, of the deflector compartment.

20. The optical scanner according to claim 1, wherein the bottom surface of the recessed portion extends outward in a direction perpendicular to the walls of the deflector compartment such that a volume of the recessed portion above the bottom surface of the recessed portion is greater than the volume of the deflector compartment.

* * * * *